Nov. 24, 1942.   B. C. ROEHRL   2,303,173
FILM CARTRIDGE AND MEANS FOR SEALING THE SAME
Filed Jan. 31, 1939
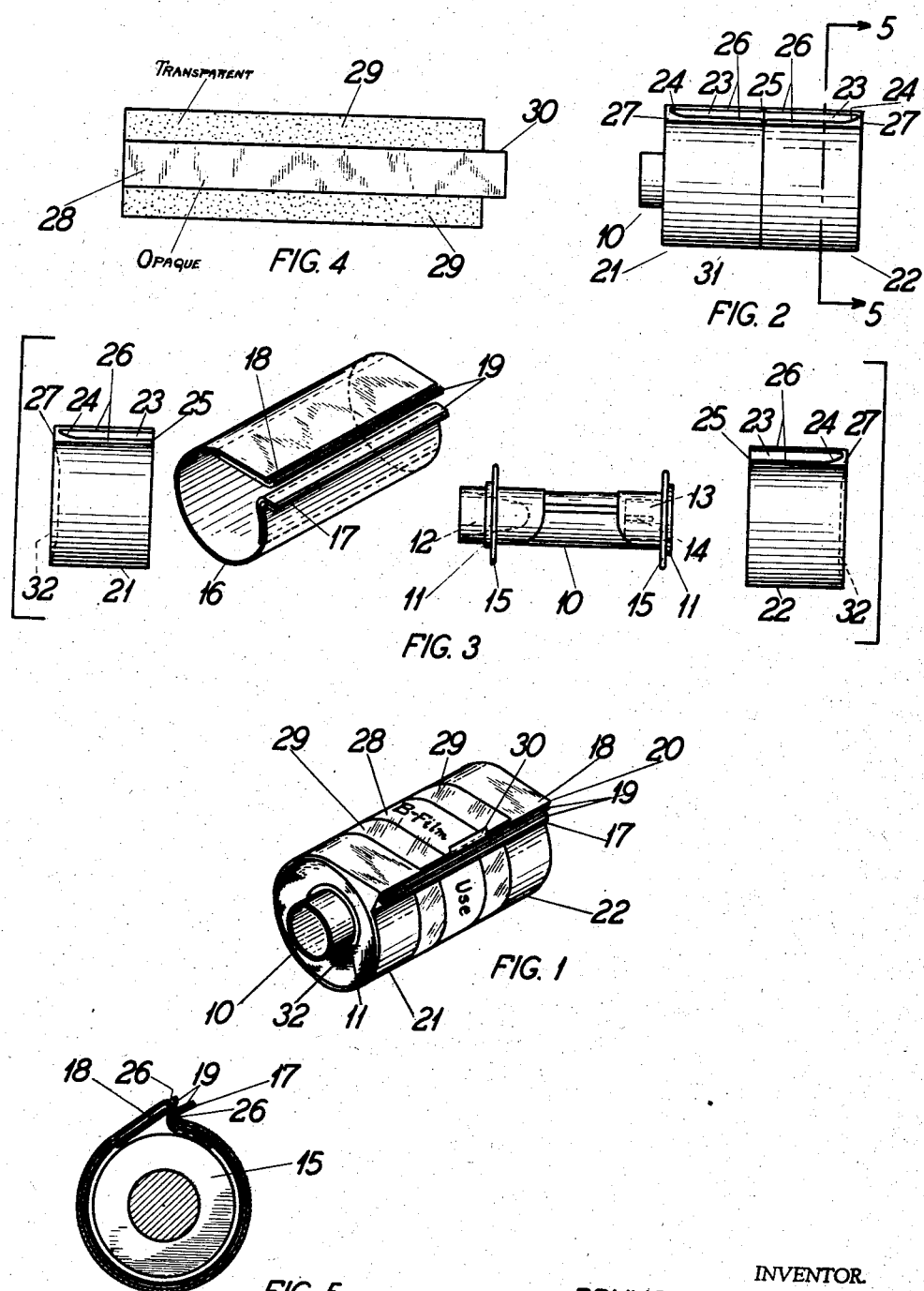
INVENTOR.
BRUNO C. ROEHRL
BY
ATTORNEY.

Patented Nov. 24, 1942

2,303,173

UNITED STATES PATENT OFFICE 2,303,173

FILM CARTRIDGE AND MEANS FOR SEALING THE SAME

Bruno C. Roehrl, Binghamton, N. Y., assignor, by mesne assignments, to General Aniline & Film Corporation, New York, N. Y., a corporation of Delaware Application January 31, 1939, Serial No. 253,855

4 Claims. (Cl. 242—71)

My invention relates to a light tight film cartridge such as is widely used in cameras of the "candid" type, and to a device for sealing such a cartridge. The film cartridges formerly known usually consisted of a heavy tube in which the film spool was carried, with a cap at each end of such tube. These caps required separate sealing means, thereby adding to the inconvenience of loading and assembling the cartridge. Furthermore, the central tubular portion, in order to be sufficiently rigid, had to be made of substantially heavy material pressed into the desired shape. It is customary to line the slots in such a cartridge with plush or other light excluding material, and this lining operation was made rather difficult and inconvenient by reason of the rigidity necessary for this part of the cartridge.

With these defects of the prior art in view, one object of my invention is to produce a compact, readily assembled, light tight cartridge which can be sealed with a single device. Another object of my invention is to produce a new and useful form of construction in which the central tubular shell portion may be made of cardboard or other flexible substance on which the light excluding material may be readily placed prior to the forming or shaping of the shell. A further object is the development of an improved film opening for such a cartridge which will more effectively exclude light from the unexposed film.

My invention accordingly comprises the arrangement and construction exemplified in the attached drawing. The scope of my invention is to be determined by the disclosures herein and is not to be limited except by the appended claims.

In the drawing, Figure 1 is a perspective view of a complete asesmbly embodying one form of my invention; Figure 2 is a front elevation particularly showing details of the slot formation; Figure 3 is an exploded view (in brackets) of the elements of the assembly shown in Figure 1; Figure 4 is a view of the underside of one form of sealing device for this cartridge; and Figure 5 is a sectional view on the line 5—5 of Figure 2, showing details of the assembly.

The following is a full and concise explanation of my invention with particular reference to the drawing forming a part of this application, and wherein like reference characters indicate like parts. The light sensitive film is wound on a spool 10 such as is well-known to those skilled in the art. This spool preferably has two flanges 15 outside each of which there is a projecting bearing surface 11. The hub of the spool may be recessed as at 12 and 13 with a lateral projection 14 within one recess for engaging with film winding or unwinding means. Around this spool may be placed a tubular shell portion 16 made of cardboard, metal, or any other suitable material. This shell portion preferably has two parallel projecting lips 17 and 18 forming a film opening through which the film can be unwound from the spool. The inner sides of these lips and part of the inner wall of the shell portion may be lined with plush or other light excluding material 19.

The cup-like end caps 21 and 22 are adapted to slide over the ends of the shell portion and are of sufficient length to abut each other forming a smooth joint 31 substantially halfway along the shell portion. These end caps may be exactly similar in construction with the exception that one is right-handed and the other left-handed. Each cap has on its cylindrical periphery an offset or projecting portion parallel to the cap axis. This projecting portion is provided with a slot or throat 23, through which the parallel lips 17 and 18 of the film opening extend. This throat is preferably flared slightly at its open end 25 in order to facilitate assembly of the cartridge. The throat is further somewhat narrowed at the outer or closed end as at 24. This narrowing of the throat presses the ends of the lips 17 and 18 tightly together, thereby acting as a further safeguard against the entrance of light at the edges of the film. On each side of the throat there is an in-turned flange 26 which is substantially perpendicular to the lips 17, 18 and the film path. Either of these flanges 26 may engage an edge of one of the lips 17 and 18 thereby preventing the shell portion from being drawn out of the slot when the film is unrolled. (See Fig. 5.)

Since the film cartridge is somewhat broader than the width of the film, I have found it desirable to provide another in-turned flange 27 at the end of the slot 23 in said end cap in order to make the length of the slot correspond more closely to the width of the film. The possibility of light leakage into the cartridge at the lateral edges of the film is thus minimized.

In the preferred form of my invention the caps 21 and 22 are designed so that their ends have circular openings at 32, the edges of which act as bearings for the projecting bearing surfaces 11 on the film spool 10. The edges of these openings 32 not only act as bearing surfaces in this way but also engage the flanges 15 of the spool so as to make a light tight joint at this point.

Since the end caps each extend substantially halfway across the film cartridge they provide sufficient strength and rigidity for the cartridge. Thus the shell portion 16 does not have to bear the usual strains to which it was subjected in older forms of construction, but may be made of rather light material, as for example cardboard. Furthermore, the proportionately large overlap between the caps and the shell portion is an added safeguard against the entry of light.

My invention also includes a new and useful method of sealing such a cartridge. My sealing device comprises a band of non-adhesive material 28 adapted to be placed circumferentially around the joint 31 formed by the meeting of the end caps. Overlying this non-adhesive band is a strip 29 of transparent adhesive material of greater width than the band in at least one direction. The band 28 is placed on the adhesive side of the strip 29 and projects slightly beyond the strip at one end, thereby forming the tab 30 which is extremely useful as a fingerpiece in unsealing the cartridge.

It will be seen that the band 28 lies immediately over the joint between the end caps and thus prevents any of the adhesive material from gumming this joint. Furthermore this band may be made of material impervious to light in order to further insure exclusion of light from the joint and, in turn, from the interior of the cartridge. Also, this band may have printed thereon any desired label or instructions identifying or explaining the product as shown in Figure 1. The overlapping transparent adhesive strip 29 not only holds the band in place but also maintains the end caps in substantially fixed relation to each other. The projecting tab 30 (see Figure 1), as explained above, is readily useful as a fingerpiece in unsealing the cartridge. This type of sealing device comprising a non-adhesive band and a broader adhesive strip can be adapted to other containers and is not restricted to film cartridges.

With regard to the preceding detailed description and drawings I claim as my invention the following:

1. A light tight film cartridge for holding a spool of sensitized film, comprising a tubular shell portion coaxial with said spool and having two substantially parallel projecting lips forming a longitudinal film opening therein parallel to the axis of the spool, two cylindrical end caps fitting over the shell portion, one end of each cap forming a light tight closure with an end of the spool, and the other ends of the caps abutting each other at an intermediate point along the shell, each of said caps having a raised longitudinal projection thereon parallel to the spool axis, said projection having a throat thereon for receiving the projecting lips of the shell portion, and single sealing means, consisting of a band of non-adhesive and non-transparent material circumferentially overlying the abutting ends of said end caps and an overlapping strip of transparent adhesive material of greater width than said band whereby the strip holds the band in place and maintains the end caps in fixed and light-tight relation to each other.

2. A light tight film cartridge for holding a spool of sensitized film, comprising a tubular shell portion coaxial with said spool and having two substantially parallel projecting lips forming a longitudinal film opening therein parallel to the axis of the spool, said lips being lined on their inner sides with a light-excluding material, two cylindrical end caps fitting over the shell portion, one end of each cap forming a light tight closure with an end of the spool, and the other ends of the caps abutting each other at an intermediate point along the shell, each of said caps having a raised longitudinal projection thereon parallel to the spool axis, said projection having a throat therein for receiving the projecting lips of the shell portion, said throat being provided with an overhanging flange on at least one side thereof whereby light is excluded and the shell portion is engaged and held in place by the flange, and single sealing means consisting of a band of non-adhesive and non-transparent material circumferentially overlying the abutting ends of said end caps and an overlapping strip of transparent adhesive material of greater width than said band whereby the strip holds the band in place and maintains the end caps in fixed and light-tight relation to each other.

3. A light tight film cartridge for holding a spool of sensitized film, comprising a tubular shell portion coaxial with said spool and having two substantially parallel projecting lips forming a longitudinal film opening therein parallel to the axis of the spool, said lips being lined on their inner sides with a light-excluding material, two cylindrical end caps fitting over the shell portion, one end of each cap forming a light tight closure with an end of the spool, and the other ends of the caps abutting each other at an intermediate point along the shell, each of said caps having a raised longitudinal projection thereon parallel to the spool axis, said projection having a throat therein for receiving the projecting lips of the shell portion, said throat being provided with an overhanging flange on at least one side thereof whereby light is excluded and the shell portion is engaged and held in place by the flange, said throat further being narrowed slightly at its closed end whereby the lips of the shell portion are pressed together at their outer ends to exclude light, and single sealing means consisting of a band of non-adhesive and non-transparent material circumferentially overlying the abutting ends of said end caps and an overlapping strip of transparent adhesive material of greater width than said band whereby the strip holds the band in place and maintains the end caps in fixed and light-tight relation to each other.

4. A light tight film cartridge for holding a spool of sensitized film, comprising a tubular shell portion coaxial with said spool and having two substantially parallel projecting lips forming a longitudinal film opening therein parallel to the axis of the spool, said lips being lined on their inner sides with a light-excluding material, two cylindrical end caps fitting over the shell portion, one end of each cap forming a light tight closure with an end of the spool, and the other ends of the caps abutting each other at an intermediate point along the shell, each of said caps having a raised longitudinal projection thereon parallel to the spool axis, said projection having a throat therein for receiving the projecting lips of the shell portion, said throat being provided with an overhanging flange on at least one side thereof whereby light is excluded and the shell portion is engaged and held in place by the flange, said throat further being narrowed slightly at its closed end whereby the lips of the shell portion are pressed together at their outer ends to exclude light, and single sealing means consisting of a band of non-adhesive material circumferentially overlying the abutting ends of said caps and a transparent adhesive strip of greater width and shorter length than said band whereby the strip holds the band in place and maintains the end caps in fixed relation to each other, while permitting an end of the band to project slightly as a fingerpiece for ready unsealing.

BRUNO C. ROEHRL.